United States Patent
Athens et al.

(10) Patent No.: US 7,912,788 B2
(45) Date of Patent: Mar. 22, 2011

(54) MUTUAL AUTHENTICATION SYSTEM AND METHOD FOR PROTECTION OF POSTAL SECURITY DEVICES AND INFRASTRUCTURE

(75) Inventors: G. Thomas Athens, Derby, CT (US); Michael J. Shukaitis, Waterbury, CT (US); Robert W. Sission, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1724 days.

(21) Appl. No.: 10/953,828

(22) Filed: Sep. 29, 2004

(65) Prior Publication Data

US 2006/0069655 A1   Mar. 30, 2006

(51) Int. Cl.
*G06Q 99/00* (2006.01)
(52) U.S. Cl. ............... 705/60; 705/64; 705/67; 705/71; 705/73; 705/401; 705/410
(58) Field of Classification Search ............... 705/50–79
See application file for complete search history.

(56) References Cited

U.S. PATENT DOCUMENTS

| | | | | |
|---|---|---|---|---|
| 6,424,954 | B1 * | 7/2002 | Leon .......................... | 705/401 |
| 2003/0005317 | A1 * | 1/2003 | Audebert et al. .............. | 713/193 |
| 2003/0177347 | A1 * | 9/2003 | Schneier et al. .............. | 713/151 |
| 2005/0074122 | A1 * | 4/2005 | Fascenda ...................... | 380/258 |

OTHER PUBLICATIONS

Derfler, "How Networks Work", Bestseller Edition, 1996, Ziff-Davis Press, Emeryville, CA, all pages.*
White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*

* cited by examiner

*Primary Examiner* — Andrew J. Fischer
*Assistant Examiner* — Jacob C Coppola
(74) *Attorney, Agent, or Firm* — Brian A. Lemm; Angelo N. Chaclas

(57) ABSTRACT

A method of authenticating a PSD and an initializing infrastructure that uses a secret key, a PSD public/private key pair and a provider public/private key pair. The infrastructure prepares a signed provider key record using the provider public key and the provider private key and a first MAC using the signed provider key record and the secret key. Both are sent to the PSD. The PSD authenticates the signed provider key record using the first MAC and the provider public key using the included digital signature. The PSD prepares a signed PSD key record using the PSD public key and the PSD private key and a second MAC using the signed PSD key record and the secret key. Both are sent to the infrastructure. The infrastructure authenticates the signed PSD key record using the second MAC and the PSD public key using the included digital signature.

10 Claims, 4 Drawing Sheets

MUTUAL AUTHENTICATION SYSTEM AND METHOD FOR PROTECTION OF POSTAL SECURITY DEVICES AND INFRASTRUCTURE

FIELD OF THE INVENTION

The present invention relates generally to the configuration/initialization of postal security devices, and more particularly to a system and method for mutual authentication of postal security device and infrastructure.

BACKGROUND OF THE INVENTION

Postage metering systems are well known in the art. A postage metering system applies evidence of postage, commonly referred to as postal indicia, to envelopes or other mailpieces and accounts for the value of the postage dispensed. A typical postage metering system includes a postal security device (PSD) coupled to a host system. The PSD is a secure processor-based accounting device that dispenses and accounts for postage value stored therein. The host system may be a meter-based host processor or a personal computer that includes a printing capability.

PSDs are often manufactured by entities other than the vendor or provider of the postage metering systems in which they are to be utilized. In this case, the PSDs are manufactured in a generic, un-initialized form without the operational data that is required for the PSD and the postage metering system in which it is incorporated to operate. Thus, when delivered to the vendor or provider, the PSDs must be initialized with the required operational data by the vendor's (or some other authorized initializing party's) computerized data processing equipment, referred to as the vendor or provider infrastructure.

Prior to the initialization of a PSD, a trust relationship must be established between the PSD and the initializing infrastructure. Without such a trust relationship, a PSD could be initialized by an imposter infrastructure, or the infrastructure could initialize an imposter PSD. In either case, an attacker could gain the ability to print free postage.

In one prior art method for establishing such a trust relationship and securing the initialization of PSDs, the PSDs are initialized in a physically secure location with access thereto being limited to only certain authorized personnel of the vendor or other initializing entity. In addition, special secure cables are used to connect to the PSDs, and the inventory and movement of the PSDs is strictly controlled and monitored.

An improved prior art method uses not only the physically secure location and other measures described above, but also requires the infrastructure to authenticate itself to each PSD through a transport unlock command. In particular, a secret cryptographic key, known to the infrastructure, is loaded into each PSD during manufacture. During initialization, the infrastructure encrypts the transport unlock command using the secret key and transmits it to the PSD. The PSD then decrypts the received message using its stored secret key and determines whether the decrypted information is a proper transport unlock command. The PSD will not accept any parameterization or key data from the infrastructure unless and until it receives a proper transport unlock command. In this method, the PSD does not authenticate itself to the infrastructure.

Both of the prior art methods and systems described above are susceptible to a substitution attack, where an unauthorized entity is substituted for an authenticated entity after the receipt of the transport unlock command has occurred. Thus, a need exists for a system and method for mutual authentication of PSDs and infrastructure that protects against substitution and other attacks.

SUMMARY OF THE INVENTION

The present invention relates to a method of mutually authenticating a postal security device and an infrastructure where the infrastructure initializes the postal security device before being placed into operation. The method uses a secret key known to the postal security device and the infrastructure. In addition, the postal security device has a PSD public key and a corresponding PSD private key, and the infrastructure has a provider public key and a corresponding provider private key. According to the method, the infrastructure prepares a signed provider key record using the provider public key and the provider private key. The signed provider key record includes the provider public key and a first digital signature. The infrastructure also creates a first message authentication code using the signed provider key record and the secret key and sends the signed provider key record and message authentication code to the postal security device. The postal security device authenticates the signed provider key record using the first message authentication code and authenticates the provider public key using the first digital signature. The postal security device prepares a signed PSD key record using the PSD public key and the PSD private key. The signed PSD key record includes the PSD public key and a second digital signature. The postal security device also prepares a second message authentication code using the signed PSD key record and the secret key and sends the signed PSD key record and the second message authentication code to the infrastructure. The infrastructure authenticates the signed PSD key record using the second message authentication code and authenticates the PSD public key using the second digital signature.

The first digital signature may be created by creating a hash of the provider public key and encrypting the hash using the provider private key, and the second digital signature may be created by creating a hash of the PSD public key and encrypting the hash using the PSD private key. In addition, the first message authentication code may be created by encrypting the signed provider key record using the secret key and the second message authentication code may be created by encrypting the signed PSD key record using the secret key. In such a case, the first message authentication code may be a portion of the encrypted signed provider key record and the second message authentication code may be a portion of the encrypted signed PSD key record. Preferably, the portion of the encrypted signed provider key record is a least significant 8 bytes thereof, and the portion of the encrypted signed PSD key record is a least significant 8 bytes thereof.

The method is preferably performed in the order described above. However, as will be appreciated, the steps of the method may be performed in a different order without departing from the scope of the present invention. In any case, the method preferably further comprises the postal security device storing the provider public key and the infrastructure storing the PSD public key.

In a preferred embodiment, the postal security device authenticates the signed provider key record by creating a third message authentication code using the signed provider key record and the secret key and comparing the first message authentication code to the third message authentication code. Similarly, the infrastructure preferably authenticates the signed PSD key record by creating a fourth message authentication code using the signed PSD key record and the secret key and compares the second message authentication to the fourth message authentication code. Moreover, in the preferred embodiment, the postal security device authenticates the provider public key by creating a third hash using the provider public key, decrypting the encrypted first hash to obtain the first hash, and comparing the first hash to the third hash. Similarly, the infrastructure preferably authenticates the PSD public key by creating a fourth hash using the PSD public key, decrypting the encrypted second hash to obtain the second hash, and comparing the second hash to the fourth hash.

In one particular embodiment, the method further comprises the postal security device having a unique identification number, the postal security device deriving the secret key from a master key and the unique identification number, wherein the master key is known to the postal security device and the infrastructure. In this case, the infrastructure obtains the unique identification number and derives the secret key from the master key and the unique identification number using known methods. In addition, the method may further include steps wherein the postal security device generates a random nonce, stores the random nonce, and sends the random nonce to the infrastructure. Also included are steps wherein the infrastructure encrypts the random nonce using the secret key and sends the encrypted random nonce to the postal security device, and wherein the postal security device decrypts the encrypted random nonce and compares the decrypted random nonce to the stored random nonce. Furthermore, in addition to or instead of these steps, the method may further comprise steps wherein the infrastructure generates a second random nonce, stores the second random nonce, and sends the second random nonce to the postal security device. In this case, the method may also include steps wherein the postal security device encrypts the second random nonce using the secret key and sends the encrypted second random nonce to the infrastructure, and wherein the infrastructure decrypts the encrypted second random nonce using the secret key and compares the decrypted second random nonce to the stored second random nonce.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
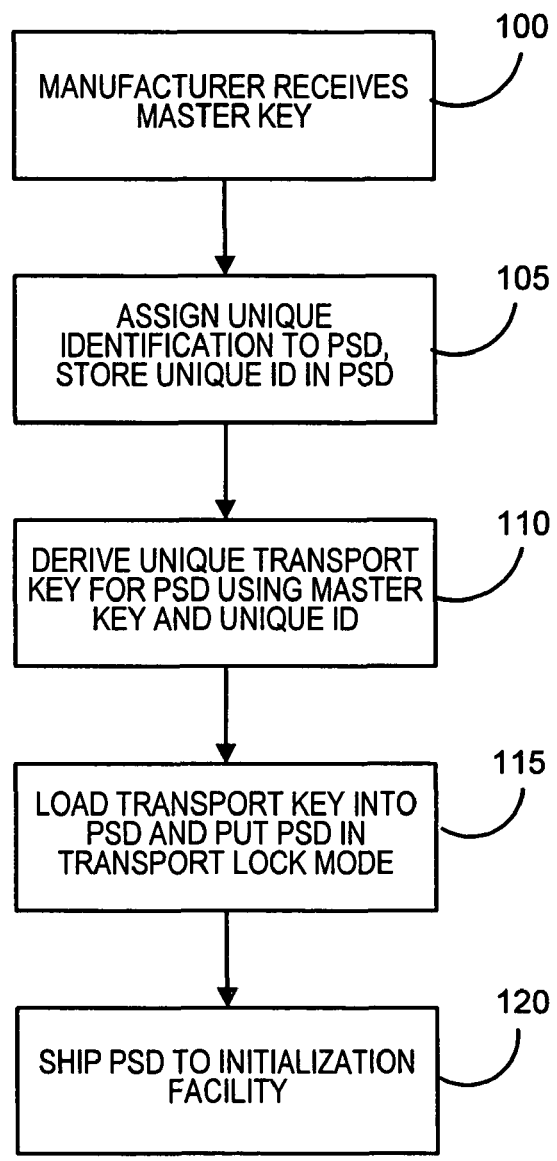
FIG. 1 is a flowchart illustrating a method of manufacturing a PSD according to the present invention.

FIG. 1 is a flowchart showing the steps utilized by a PSD manufacturer (in particular its computer system) in manufacturing a PSD according to an aspect of the present invention. As seen at step 100, the PSD provider supplies the PSD manufacturer with a master cryptographic key that will be used to derive other secret cryptographic keys utilized in the present invention according to known methods. Preferably, the master key is a 3DES master key utilized by the well known triple data encryption standard (3DES) algorithm. As is known, the 3DES algorithm actually utilizes either two or three secret keys. However, for convenience, whenever the 3DES algorithm is mentioned herein, the term "key" will be used to refer to the set of two or three 3DES keys. Next, at step 105, the PSD manufacturer assigns a unique identification number, commonly called a manufacturing sequence number or MSQ, to the PSD. Each PSD manufactured by the manufacturer will be assigned its own unique identification number that is unique to that particular PSD. The unique identification number is stored in the PSD in memory that is provided as a part thereof. At step 110, the manufacturer derives a unique transport key for the PSD using known techniques based on the unique identification number assigned to the PSD and the master key it received from the provider. The unique transport key is a secret, symmetric key. Then, at step 115, the transport key is loaded (stored) into the PSD and the PSD is placed in a transport lock mode. Once in the transport lock mode, the PSD will not function unless and until it receives an appropriate unlock command as described herein. As seen in step 120, the PSD may then be securely shipped to the provider's initialization facility.

Figure 2:
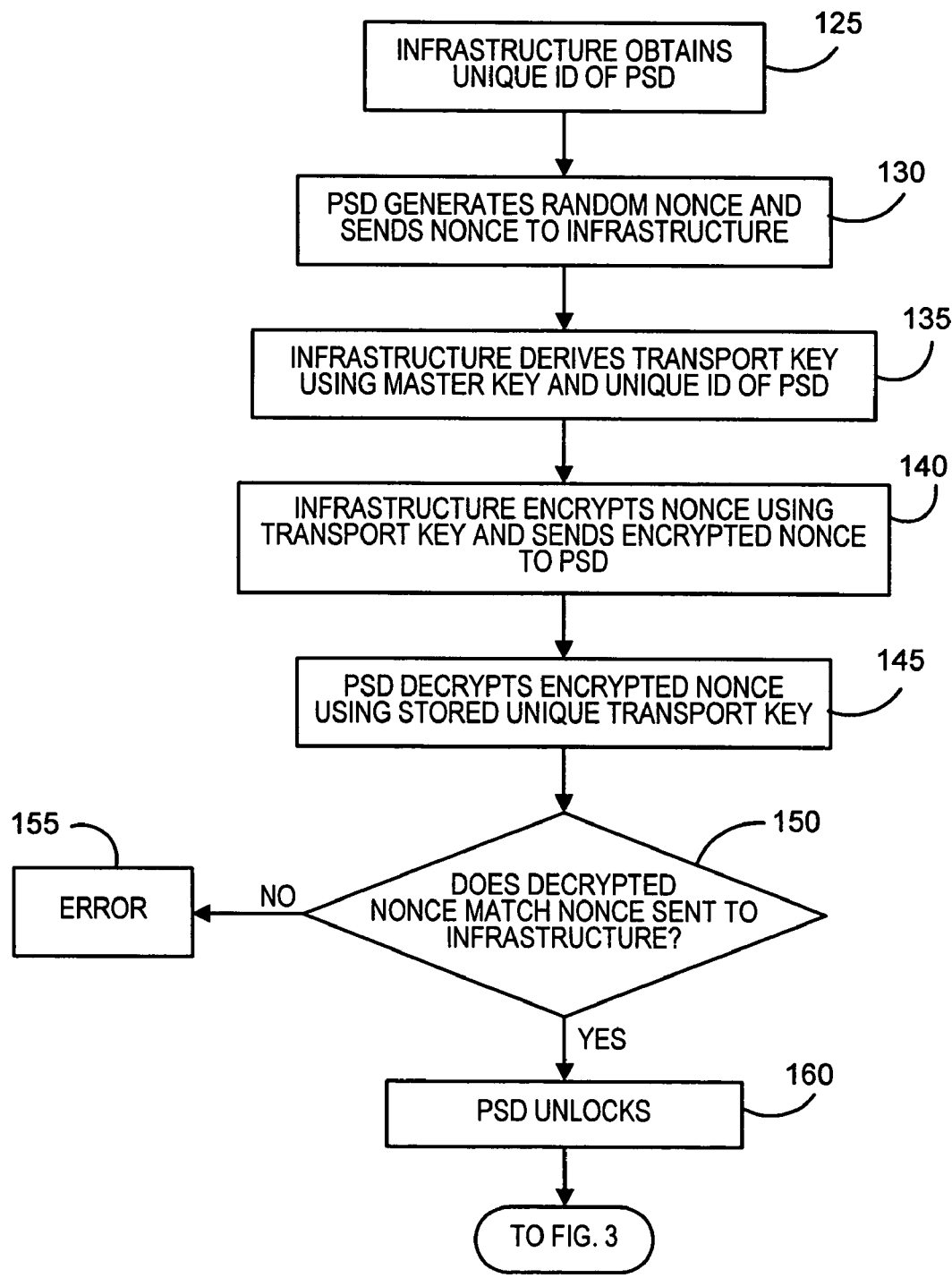
FIGS. 2, 3 and 4 are flowcharts illustrating a method of initializing a PSD according to an embodiment of the present invention.
Figure 3:
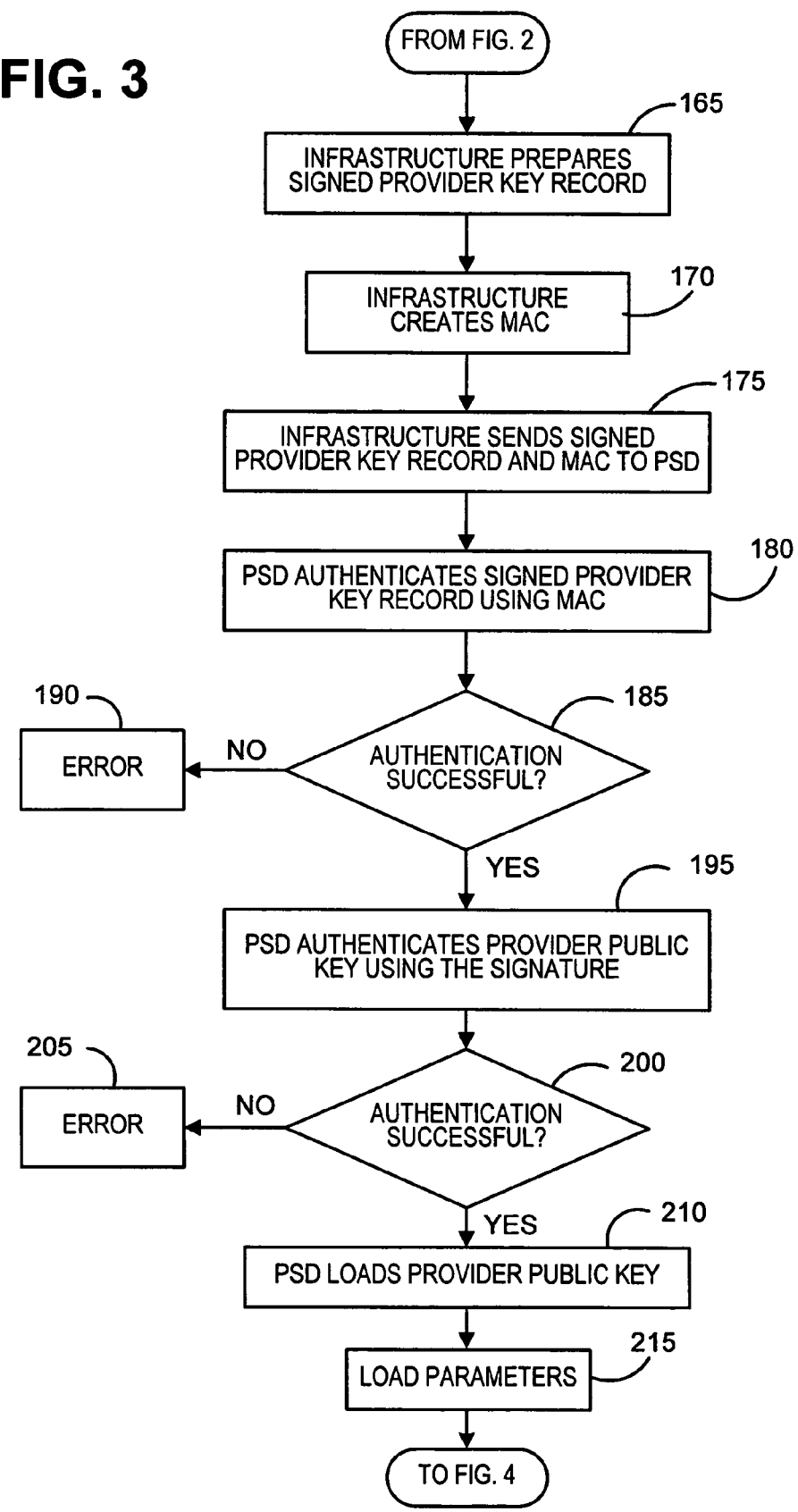
Figure 4:
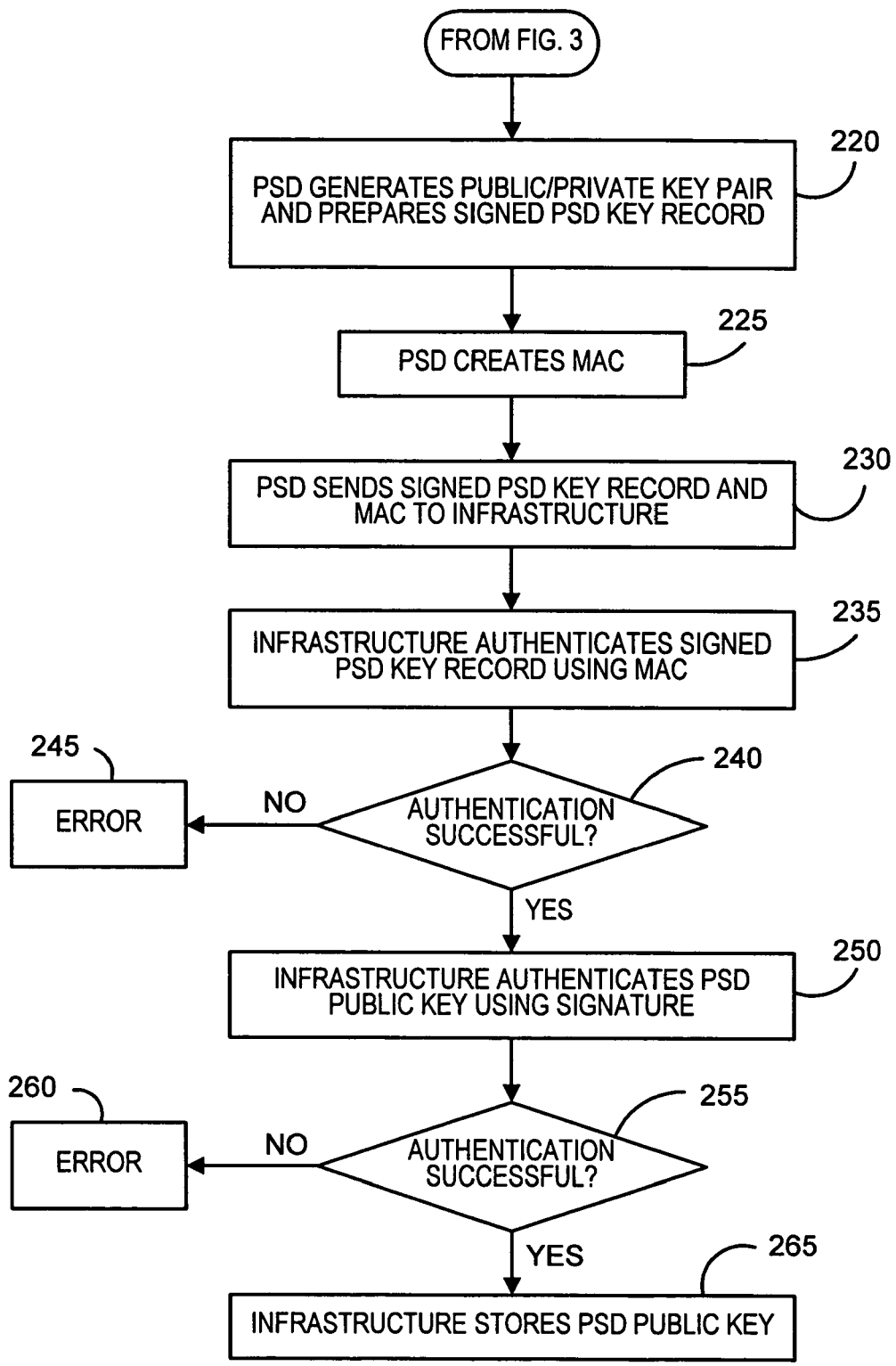

FIGS. 2, 3 and 4 are flowcharts showing the steps for mutually authenticating a PSD manufactured according to the method shown in FIG. 1 and an authorized infrastructure, such as the provider's infrastructure, and initializing the PSD for operation. As seen at step 125, the infrastructure obtains the unique identification number of the PSD to be authenticated and utilized. This can be provided, for example, by the PSD. On the command of the infrastructure, the PSD then generates a random nonce and sends the random nonce to the infrastructure as shown in step 130. At step 135, the infrastructure next derives a secret symmetric key using the master key and the unique identification number obtained from the PSD. If the PSD and infrastructure are authentic, this key will be the transport key derived in step 110 of FIG. 1. The infrastructure then encrypts the nonce using the key just derived and sends the encrypted nonce to the PSD at step 140. At steps 145 and 150, the PSD decrypts the encrypted nonce using the stored transport key and compares the decrypted nonce to the nonce that was sent to the infrastructure. If the nonces do not match, then that means that the infrastructure cannot be authenticated by the PSD, and an error indication is provided at step 155, after which the attempt to initialize the PSD will cease. If the nonces do match, then, as seen in step 160, the PSD unlocks and will continue the initialization.

Referring now to FIG. 3, at step 165, the infrastructure next prepares a signed provider key record. The infrastructure possesses a provider public/private key pair, and the signed provider key record comprises the provider public key signed by the provider private key (a digital signature is created using the provider private key). Preferably, as is known in the art, this means that the record includes the provider public key (in clear text) and a one-way hash of the provider public key encrypted using the provider private key (the digital signature). Next, at step 170, the infrastructure creates a message authentication code (MAC) using the signed provider key record and the transport key derived in step 135 of FIG. 2. In the preferred embodiment, the signed public key record is encrypted using the 3DES algorithm and the transport key (which in this embodiment is a 3DES key), and the least significant 8 bytes of the encrypted data are used as the MAC. It will be appreciated that other types of MACs and methods of creating MACs may be used, such as MACs that use one-way hash functions or other block ciphers to generate data that is then encrypted with a secret key. As seen in step 175, the infrastructure sends the signed provider key record and the MAC to the PSD. In response, as shown in step 180, the PSD authenticates the signed provider key record using the MAC. In particular, the PSD encrypts the received signed provider key record using its stored transport key and compares the least significant 8 bytes of the encrypted data to the MAC. As shown in steps 185 and 190, if the least significant 8 bytes does not match the MAC, then an error condition is detected and the initialization sequence ceases. If, however, they do match, then, at step 195, the PSD authenticates the provider public key using the signature that is provided therewith. Specifically, the PSD decrypts the digital signature using the provider public key, creates a hash of the provider public key using the same hash function used by the infrastructure, and compares the decrypted digital signature (which is a hash) to the created hash. As shown in steps 200 and 205, if the compared hashes do not match, then an error condition is detected and the initialization sequence ceases. If, however, the hashes do match, then, at step 210, the PSD loads and stores the provider public key (from the signed provider key record), and at step 215 will accept operating parameters and information for loading, such as, for example, a product code, a serial number, configuration and monetary data for the country in which the PSD will be used, and initial register values.

Referring to FIG. 4, at step 220, the PSD then generates a public/private key pair using known methods and prepares a signed PSD key record comprising the PSD public key signed by the PSD private key (a digital signature is created using the PSD private key). Preferably, this means that the signed PSD key record includes the PSD pubic key (in clear text) and a one-way hash of the PSD public key encrypted using the PSD private key (the digital signature). Next, at step 225, the PSD creates a message authentication code (MAC) using the signed PSD key record and the stored transport key that was derived in step 110 of FIG. 1. In the preferred embodiment, the signed PSD key record is encrypted using the 3DES algorithm and the transport key and the least significant 8 bytes of the encrypted data are used as the MAC. However, as noted above, other MACs may also be used. At step 230, the PSD sends the signed PSD key record and the MAC to the infrastructure. The infrastructure then authenticates the signed PSD key record using the MAC at step 235 in a manner similar to that described above in connection with step 180 of FIG. 3. As seen in steps 240 and 245, if the authentication is not successful, an error condition is detected and the initialization sequence ceases. If, however, the authentication is successful, then, at step 250, the infrastructure authenticates the PSD public key using the digital signature provided in the signed PSD key record in a manner similar to that described above in connection with step 195 of FIG. 3. As seen in steps 255 and 260, if the authentication is not successful, then an error condition will be detected and the initialization sequence will cease. If, however, the authentication is successful, then, at step 265 the infrastructure stores the PSD public key. At this point, mutual authentication and initialization are complete and the PSD may be provided to a user. The provider public/private key pair and PSD public/private key pair loaded during initialization may then be used in the field for facilitating secure communication between the PSD and the provider.

According to an alternative embodiment of the present invention, a random nonce may be used to authenticate the PSD to the infrastructure. Such steps may be utilized either instead of or in addition to (either before or after) the steps shown and described in connection with FIG. 2. In particular, in this embodiment, the infrastructure generates a random nonce, stores the random nonce and sends the random nonce to the PSD. The PSD then uses the secret key that was derived in step 110 of FIG. 1 to encrypt the random nonce, and sends the encrypted random nonce to the infrastructure. The infrastructure then decrypts the encrypted random nonce using a secret key derived in a manner described in connection with step 135 of FIG. 2 and compares the decrypted random nonce to the random nonce it has stored. If the values do not match, then an error condition is indicated and authentication and initialization ceases. If, however, the values do match, then the method proceeds to FIG. 3 if the steps just described are utilized instead of or after the steps of FIG. 2, and to step 130 if they are utilized before the steps of FIG. 2.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of mutually authenticating a postal security device and an infrastructure, said infrastructure initializing said postal security device, said postal security device having a unique identification number, a PSD public key, and a PSD private key corresponding to said PSD public key, said infrastructure having a provider public key and a provider private key corresponding to said provider public key, the method comprising:

said infrastructure obtaining said unique identification number of said postal security device and deriving a secret key from said unique identification number and a master key;

said infrastructure preparing a signed provider key record using said provider public key and said provider private key, said signed provider key record including said provider public key and a first digital signature;

said infrastructure creating a first message authentication code using said signed provider key record and said secret key and sending said signed provider key record and said first message authentication code to said postal security device;

said postal security device authenticating said signed provider key record using said first message authentication code;

said postal security device authenticating said provider public key using said first digital signature;

said postal security device preparing a signed PSD key record using said PSD public key and said PSD private key, said signed PSD key record including said PSD public key and a second digital signature;

said postal security device preparing a second message authentication code using said signed PSD key record and said secret key and sending said signed PSD key record and said second message authentication code to said infrastructure;

said infrastructure authenticating said signed PSD key record using said second message authentication code;

said infrastructure authenticating said PSD public key using said second digital signature;

said postal security device generating a random nonce, storing said random nonce, and sending said random nonce to said infrastructure;

said infrastructure encrypting said random nonce using said secret key and sending the encrypted random nonce to said postal security device; and said postal security device decrypting said encrypted random nonce using the secret key and comparing said decrypted random nonce to said stored random nonce.

2. A method according to claim 1, said first digital signature being created by creating a first hash of said provider public key and encrypting said first hash using said provider private key, said second digital signature being created by creating a second hash of said PSD public key and encrypting said second hash using said PSD private key.

3. A method according to claim 2, said postal security device authenticating said provider public key by creating a third hash using said provider public key, decrypting said encrypted first hash to obtain said first hash, and comparing said first hash to said third hash, and said infrastructure authenticating said PSD public key by creating a fourth hash using said PSD public key, decrypting said encrypted second hash to obtain said second hash, and comparing said second hash to said fourth hash.

4. A method according to claim 1, said first message authentication code being created by encrypting said signed provider key record using said secret key, said second message authentication code being created by encrypting said signed PSD key record using said secret key.

5. A method according to claim 4, said first message authentication code being a portion of the encrypted signed provider key record, and said second message authentication code being a portion of the encrypted signed PSD key record.

6. A method according to claim 5, said portion of the encrypted signed provider key record being a least significant 8 bytes thereof, said portion of the encrypted signed PSD key record being a least significant 8 bytes thereof.

7. A method according to claim 1, said method further comprising said postal security device storing said provider public key and said infrastructure storing said PSD public key.

8. A method according to claim 1, said postal security device authenticating said signed provider key record by creating a third message authentication code using said signed provider key record and said secret key and comparing said first message authentication code to said third message authentication code, and said infrastructure authenticating said signed PSD key record by creating a fourth message authentication code using said signed PSD key record and said secret key and comparing said second message authentication code to said fourth message authentication code.

9. A method according to claim 1, further comprising:

said infrastructure generating a second random nonce, storing said second random nonce, and sending said second random nonce to said postal security device;

said postal security device encrypting said second random nonce using said secret key and sending the encrypted second random nonce to said infrastructure; and said infrastructure decrypting said encrypted second random nonce using the secret key and comparing said decrypted second random nonce to said stored second random nonce.

10. A method according to claim 1, further comprising:

said infrastructure generating a random nonce, storing said random nonce, and sending said random nonce to said postal security device;

said postal security device encrypting said random nonce using said secret key and sending the encrypted random nonce to said infrastructure; and said infrastructure decrypting said encrypted random nonce and comparing said decrypted random nonce to said stored random nonce.

* * * * *